United States Patent [19]

Ikeda et al.

[11] Patent Number: 4,896,257
[45] Date of Patent: Jan. 23, 1990

[54] COMPUTER SYSTEM HAVING VIRTUAL MEMORY CONFIGURATION WITH SECOND COMPUTER FOR VIRTUAL ADDRESSING WITH TRANSLATION ERROR PROCESSING

[75] Inventors: Kazuhiko Ikeda, Yokohama; Naoki Koizumi, Kanagawa, all of Japan

[73] Assignee: Panafacom Limited, Yamato, Japan

[21] Appl. No.: 275,598

[22] Filed: Nov. 23, 1988

Related U.S. Application Data

[63] Continuation of Ser. No. 819,785, Jan. 17, 1986, abandoned.

[30] Foreign Application Priority Data

Jan. 19, 1985 [JP] Japan .................................. 60-8077

[51] Int. Cl.⁴ .............................................. G06F 13/00
[52] U.S. Cl. .................................. 364/200; 364/256.3; 364/256.4; 364/228
[58] Field of Search ... 364/200 MS File, 900 MS File; 371/51, 16

[56] References Cited

U.S. PATENT DOCUMENTS

| | | | |
|---|---|---|---|
| 3,723,976 | 3/1973 | Alvarez | 364/200 |
| 3,902,163 | 8/1975 | Ampahl | 364/200 |
| 4,163,280 | 7/1979 | Mori et al. | 364/200 |
| 4,373,179 | 2/1983 | Katsumata | 364/200 |
| 4,386,402 | 5/1983 | Toy | 364/200 |
| 4,481,573 | 11/1984 | Fukunaga et al. | 364/200 |
| 4,513,369 | 4/1985 | Sato | 364/200 |
| 4,604,688 | 8/1986 | Tone | 364/200 |

OTHER PUBLICATIONS

Wescon Conference Record, "Virtual Memory Concepts for 16-Bit Microprocessors and Computers", Sep. 15, 1981, Calif.

"Dual Purpose Use of TLB Registers", IBM Technical Disclosure Bulletin No, 27, No. 11, Apr. 1985, p. 6415.

*Primary Examiner*—Lawrence E. Anderson
*Attorney, Agent, or Firm*—Armstrong, Nikaido, Marmelstein, Kubovcik & Murray

[57] ABSTRACT

A computer system including a first computer unit processing user's tasks, a second computer unit performing a halt operation for a virtual memory access, a main memory storing a plurality of virtual accessing data, a buffer memory unit temporarily storing a part of the virtual accessing data and having a faster operation time than that of the main memory, and a control unit controlling the above. The buffer memory unit receives a virtual memory address from the first computer unit and outputs a corresponding actual memory address for accessing the main memory. The control unit includes first and second latches and outputs a bi-state interruption signal and a multilevel interruption signal in response to states of the first and second latch circuits. The first latch is set when a corresponding virtual access data is invalid so that the second computer unit is operated in response to the bi-state interruption signal to store a corresponding virtual access data in the main memory unit into the buffer memory unit. The second latch is set when the corresponding virtual access data in the main memory unit to be stored into the buffer memory unit is erroneous so that the multilevel interruption signal is output from the control unit to the first computer unit to terminate the operation of the virtual memory access.

19 Claims, 7 Drawing Sheets

Fig. 4a  CLK                 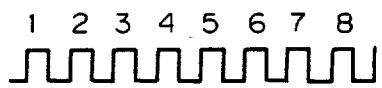
Fig. 4b  Add. $A_1$–$A_{23}$   
Fig. 4c  $\overline{AS}$        
Fig. 4d  $\overline{ATBERR}$    
Fig. 4e  $\overline{ATBFLT}$    
Fig. 4f  $\overline{RAS}$       
Fig. 4g  $\overline{CAS}$       
Fig. 4h  $\overline{BSERR}$     
Fig. 4i  $\overline{DTACK}$     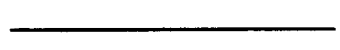

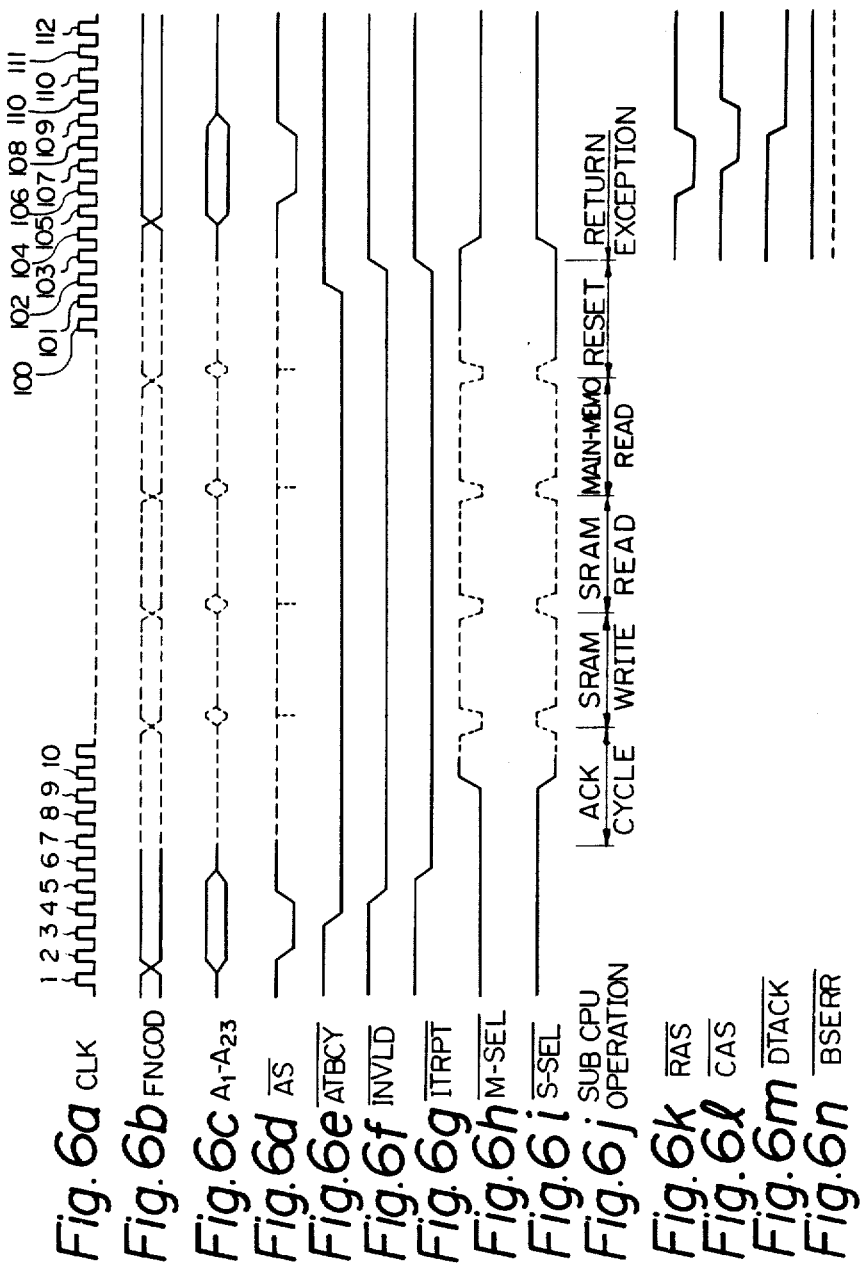

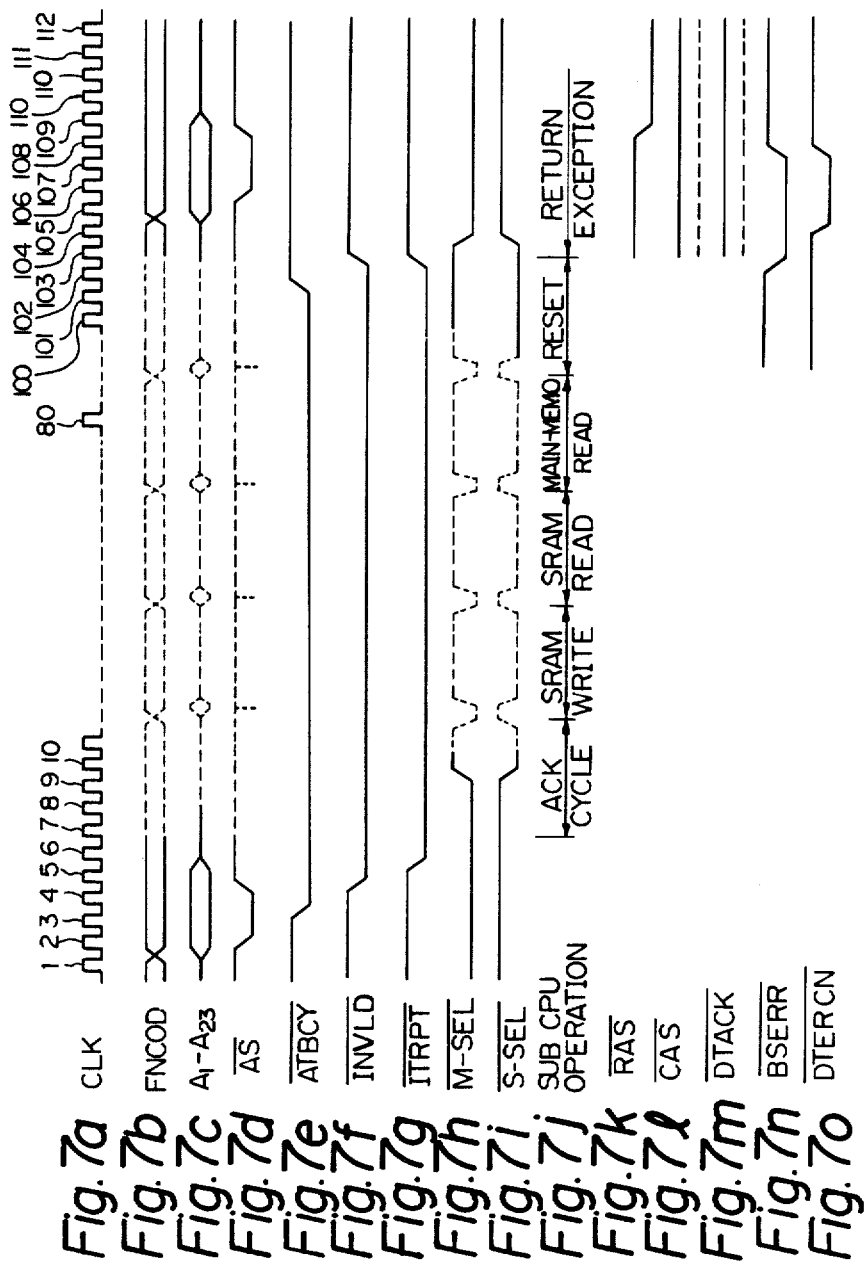

COMPUTER SYSTEM HAVING VIRTUAL MEMORY CONFIGURATION WITH SECOND COMPUTER FOR VIRTUAL ADDRESSING WITH TRANSLATION ERROR PROCESSING

This application is a continuation of application Ser. No. 819,785 filed Jan. 17, 1986 now abandoned.

BACKGROUND OF THE INVENTION

1. Field of the Invention

The present invention relates to a computer system having a virtual memory configuration. More particularly, it relates to an improvement of address translation-error processing for a virtual memory access to a virtual memory configuration.

2. Description of the Related Art

Virtual memory computer systems are extensively used for alleviating tasks of management of memory areas to be used in user programs. In the virtual memory computer systems, the relationship between logical (virtual) addresses used in the programs and physical (actual) addresses used for actually accessing a main memory is predetermined. A plurality of data, each including the above relationship concerning each unit region of virtual memory and thus known as virtual accessing data in this specification, are stored in the main memory. Upon request of a virtual memory access from a central processor unit (CPU), a corresponding physical address is determined on the basis of the above relationship and an access operation of the physical address to the main memory is effected. In order to speed up the translation (or conversion) from a logical address output from the CPU due to the operation of the program therein to a physical address with reference to the virtual accessing data, an address translation buffer memory (ATB) is provided in the virtual memory computer system. The ATB may be formed by a randomaccess memory (RAM) and has a faster access time than the main memory. However, in general, the memory capacity of the ATB is insufficient for storing all of the virtual accessing data in the main memory. Accordingly, upon request of a virtual memory access from the CPU, corresponding virtual accessing data in the main memory is once transferred to certain memory cells in the ATB, and the address translation is effected in accordance therewith. The above transfer from the main memory to the ATB is effected for a predetermined size of memory, for example, 4 k-bytes. The transferred virtual accessing data remains in the ATB unless deleted due to updating for new virtual accessing data when the ATB is full. Accordingly, subsequent virtual memory accesses of the virtual accessing data in the ATB are improved in the time take. Preferably, virtual accessing data with a high frequency of access requests should be kept in the ATB.

The CPU includes means, which consists of hardware and software, for processing the above virtual memory accessing operation. The software has a halt processing function (or task) which, first, halts the virtual memory accessing operation of the CPU when corresponding virtual accessing data is not in the ATB or corresponding virtual accessing data in the ATB is not suitable for use because of such as invalid data or a parity error, second, transfers correct corresponding virtual access data in the main memory to the ATB, and third, restores the virtual memory accessing operation of the CPU. If the corresponding virtual access data to be transferred to the ATB is not suitable, naturally, the data transfer is not effected and thus the program in the CPU for which the virtual memory accessing operation is halted will be aborted.

A virtual memory computer system including a single CPU, however, suffers from the disadvantage of the low speed of the above halt operation. In the CPU, a multilevel interruption is used for the above halt operation, thus a considerably long time is required for analyzing the interruption. In addition, a plurality of programs are operated in parallel, thus the above halt operation may be disturbed by the operation of the other programs.

In order to overcome the above, virtual memory computer systems further including a sub-CPU for processing the halt operation in addition to a main CPU are known (e.g., Hunter L. Scales III, "Implementing a virtual memory system using the MC 68451 memory management unit", Wescon/81, Professional Program Session Record 9/4, pp. 1 to 8). The main CPU performs tasks of the user programs. The sub-CPU performs the memory management including the above halt processing. The sub-CPU is operable in response to a single significant-level interruption, and thus the halt operation time can be shortened. However, the above virtual memory system still suffers from disadvantages of the troublesome procedure of the halt operation and low speed.

SUMMARY OF THE INVENTION

It is an object of the present invention to provide a virtual memory computer system having a simple virtual memory processing means.

It is another object of the present invention to provide a virtual memory computer system with improved virtual memory processing.

According to the present invention, there is provided a computer system including: a first computer unit; a second computer unit independently operable from the first computer unit; a main memory unit, operatively connected to the first and second computer units, storing a plurality of virtual accessing data each including information defining a virtual memory access; a buffer memory unit, operatively connected to the first and second computer unit, storing a part of the plurality of virtual access data in the main memory unit and outputting an actual memory address for accessing the main memory unit to the main memory unit in response to a virtual memory address of a virtual memory access from the first computer unit; and a unit for controlling operations of the first and second computer units, the main memory unit, and the buffer memory unit, including first and second latches, and outputting a bi-state interruption signal and a multilevel interruption signal in response to states of the first and second latches. The first latch in the control unit is set when corresponding virtual access data from the buffer memory unit is invalid so that the second computer unit is operated in response to the bi-state interruption signal from the control unit to store corresponding virtual access data in the main memory unit into the buffer memory unit. The second latch in the control unit is set when the corresponding virtual access data in the main memory unit to be stored into the buffer memory unit is erroneous, so that the multilevel interruption signal is output from the control unit to the first computer unit to terminate the operation of the virtual memory access from the first computer unit.

BRIEF DESCRIPTION OF THE DRAWINGS

Other objects and features of the present invention will be described below in detail with reference to the accompanying drawings, in which:

FIGS. 4a to 4i are timing charts illustrating the operation of the circuit shown in FIG. 3;

FIGS. 6a to 6n and 7a to 7o are timing charts illustrating operations of the circuit shown in FIG. 5.

DESCRIPTION OF THE PREFERRED EMBODIMENTS

Figure 1:
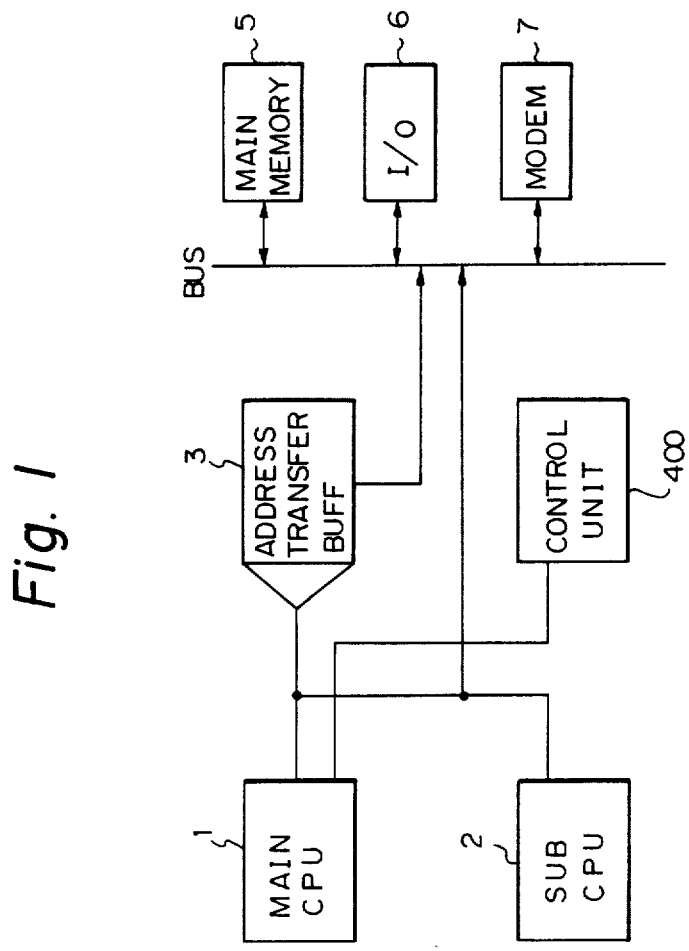
FIG. 1 is a schematic block diagram of a virtual memory computer system of an embodiment in accordance with the present invention.

Referring to FIG. 1, a virtual memory computer system includes a main CPU 1 as a first computer means, a sub-CPU 2 as a second computer means, an ATB 3 formed by a RAM device, a control unit 400, a main memory 5, an input/output (I/O) unit 6, and a MODEM unit 7. The main CPU 1 may access the main memory 5, the I/O unit 6, and the MODEM unit 7 through the ATB 3. On the other hand, the sub-CPU 2 can access directly the main memory 5, the I/O unit 6, and the MODEM unit 7. This is because, on the one hand, the main CPU 1 is designed to follow the virtual access mode, so that the programs operated in the main CPU 1 are simplified. On the other hand, the sub-CPU 2 does not provide normal user's tasks, but manages the main memory 5, the ATB 3, etc.

Figure 2:
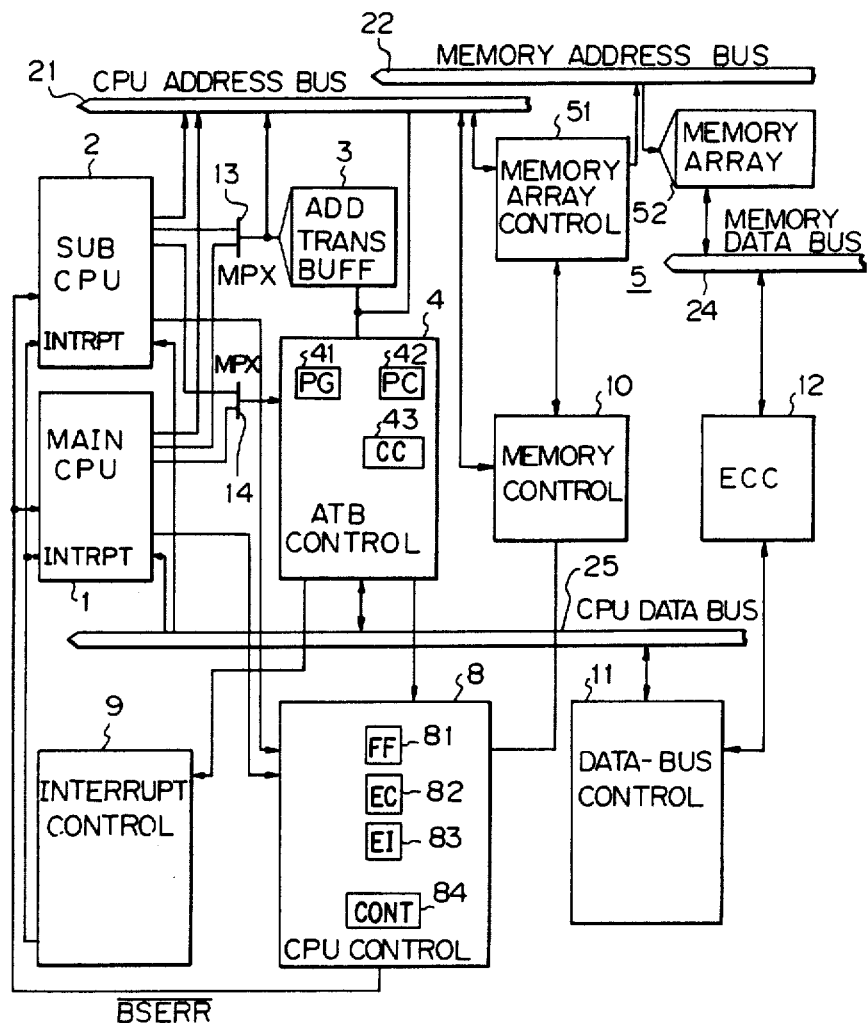
FIG. 2 is a block diagram of the virtual memory computer system shown in FIG. 1.

Referring to FIG. 2, showing a detailed block diagram of the virtual memory computer system shown in FIG. 1, the control unit 400 in FIG. 1 includes an ATB control unit 4, a CPU control unit 8, an interrupt control unit 9, a memory control unit 10, and a data bus control unit 11. The main memory 5 shown in FIG. 1 consists of a memory array control unit 51 and a memory array unit 52. The virtual memory computer system further includes an error checking and correcting (ECC) circuit 12, as well known and used for the main memory 5, a CPU address bus 21, a memory address bus 22, a memory data bus 24, a CPU data bus 25, and multiplexers 13 and 14. The multiplexers 13 and 14 are driven by the CPU control unit 8, connecting between the main CPU 1 or the sub-CPU 2 and the ATB 3 and between the main CPU 1 or the sub-CPU 2 and the ATB control unit 4 in response to an operation mode of the CPU's 1 and 2.

Figure 3:
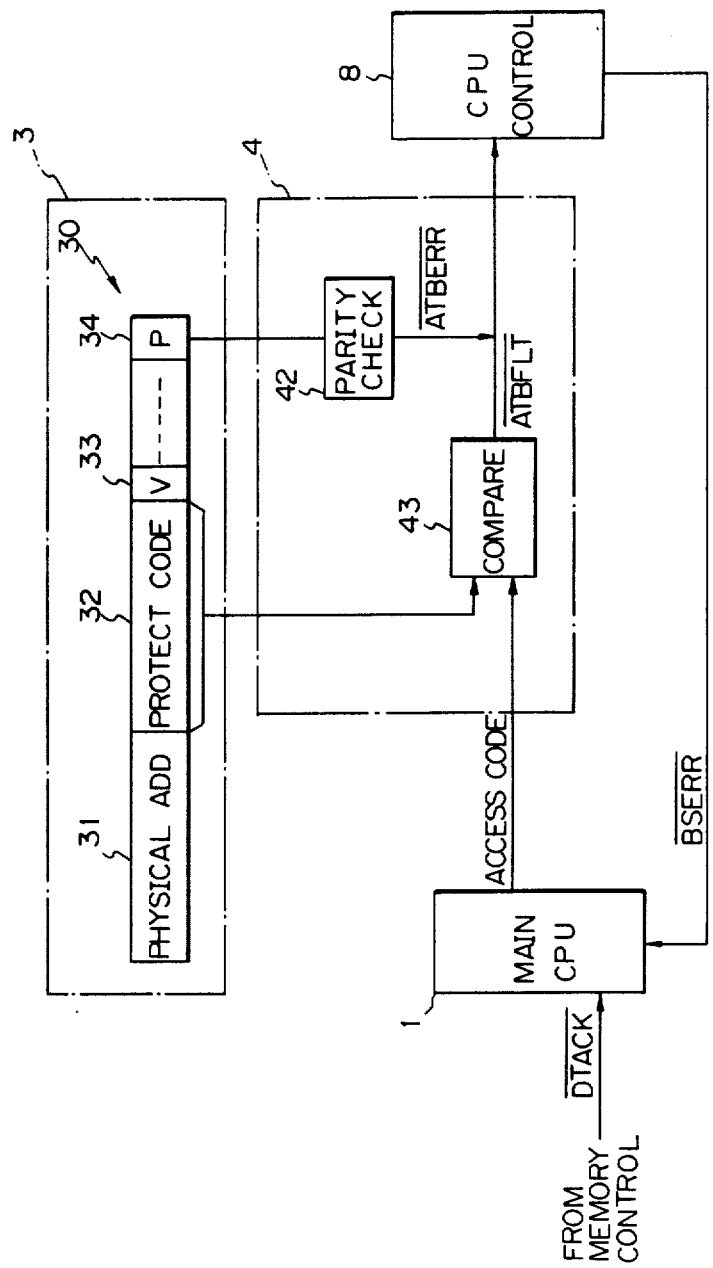
FIG. 3 is a circuit diagram of a part of the virtual memory computer system shown in FIG. 2.

The ATB control unit 4 includes a parity generator 41, which generates a parity of virtual accessing data from the sub-CPU 2 through the multiplexer 14 prior to storing the virtual accessing data to the ATB 3. The ATB control unit 4 also includes a parity check circuit 42 which checks a parity of the virtual accessing data from the ATB 3. The ATB control unit 4 further includes a compare circuit 43. The circuits 41 to 43 will be described in more detail later with reference to FIG. 3.

The CPU control unit 8 includes an invalid flip-flop (FF) 81, a data error control FF 82, and a data error indication FF 83, as first to third latch means, respectively. The operation of these FF's 81 to 83 will also be described later with reference to FIG. 5.

In FIG. 2, the I/0 unit 6 and the MODEM unit 7, which are connected to the buses 22 and 24, are omitted to simplify the drawing.

The parity check error operation and a protection code coincidence operation will be described referring to FIG. 3 and FIGS. 4a to 4i.

In the ATB 3, a plurality of virtual accessing data are already transferred. Virtual accessing data 30 includes a physical address 31, a protection code 32, an invalid bit 33, and a parity code 34. The physical address 31 is an upper part of an actual access address to the main memory 5 and is to be translated from a logical address from the main CPU 1. The lower part of the actual access address is the corresponding part of the logical address itself, and not translated. The protection code 32 designates memory protection of the physical address, such as an inhibit of data store to the physical address or an inhibit of data read from the physical address. The invalid bit 33 indicates that the physical address 31 and/or the protection code 32 are incorrect and thus cannot be used for the virtual memory accessing.

When the main CPU 1 requests virtual memory access with an access code including an address signal of $A_1$ to $A_{23}$ shown in FIG. 4b, the CPU control unit 8 connects the main CPU 1 and the ATB control unit 4 through the multiplexer 14, supplying the access code to the ATB control unit 4. The ATB control unit 4 searches for corresponding virtual accessing data 30 in the ATB 3 and retrieves it when found. In other words, the corresponding virtual accessing data 30 is retrieved into the ATB control unit 4 in response to an address strobe signal $\overline{AS}$ which ensures the address signal $A_1$ to $A_{23}$ when the $\overline{AS}$ signal is low level. If errors are not detected in the ATB control unit 4, normal virtual memory accessing may be performed.

If the virtual accessing data 30 includes a parity error, the parity error is detected at the parity check circuit 42, resulting in an address transfer buffer data error signal $\overline{ATBERR}$ being output from the parity check circuit 42 to the CPU control unit 8 and the main memory 5 to be accessed in response to the above access code from the main CPU 1 (FIG. 4d). Upon receipt of the $\overline{ATBERR}$ signal, the CPU control unit 8 immediately outputs a bus error signal $\overline{BSERR}$ which is a low enable to the main CPU 1 (FIG. 4h). In the main memory 5, a row access strobe signal $\overline{RAS}$ was changed to low level in response to the $\overline{AS}$ signal (FIG. 4f), however, no column access signal $\overline{CAS}$ is changed upon receipt of the $\overline{ATBERR}$ signal therein (FIG. 4g), whereby no actual memory access to the main memory 5 is effected. Accordingly, a data acknowledge signal $\overline{DTACK}$ is still kept at a high level (FIG. 4i). After the output of the above access code, the main CPU 1 waits until the main CPU 1 receives either a DTACK signal of low enable, which indicates completion of the virtual memory accessing, or a $\overline{BSERR}$ signal of low enable, which indicates detection of a defect. In the latter case, the $\overline{BSERR}$ signal is supplied to the main CPU 1, and the task for which the above virtual memory accessing is requested is aborted.

If the access code from the main CPU 1 coincides with the protection code 32 in the virtual accessing data 30, which indicates an inhibit of the memory access, the compare circuit 43 outputs an address translation buffer data fault signal $\overline{ATBFLT}$ of low enable to the CPU control unit 8 and the main memory 5, as shown in a dotted line in FIG. 4e. Upon receipt of the $\overline{ATBFLT}$, the CPU control unit 8 also outputs the $\overline{BSERR}$ signal to the main CPU 1. The main memory 5 is not accessed. The task for which the above virtual memory accessing is requested is also aborted.

Figure 5:
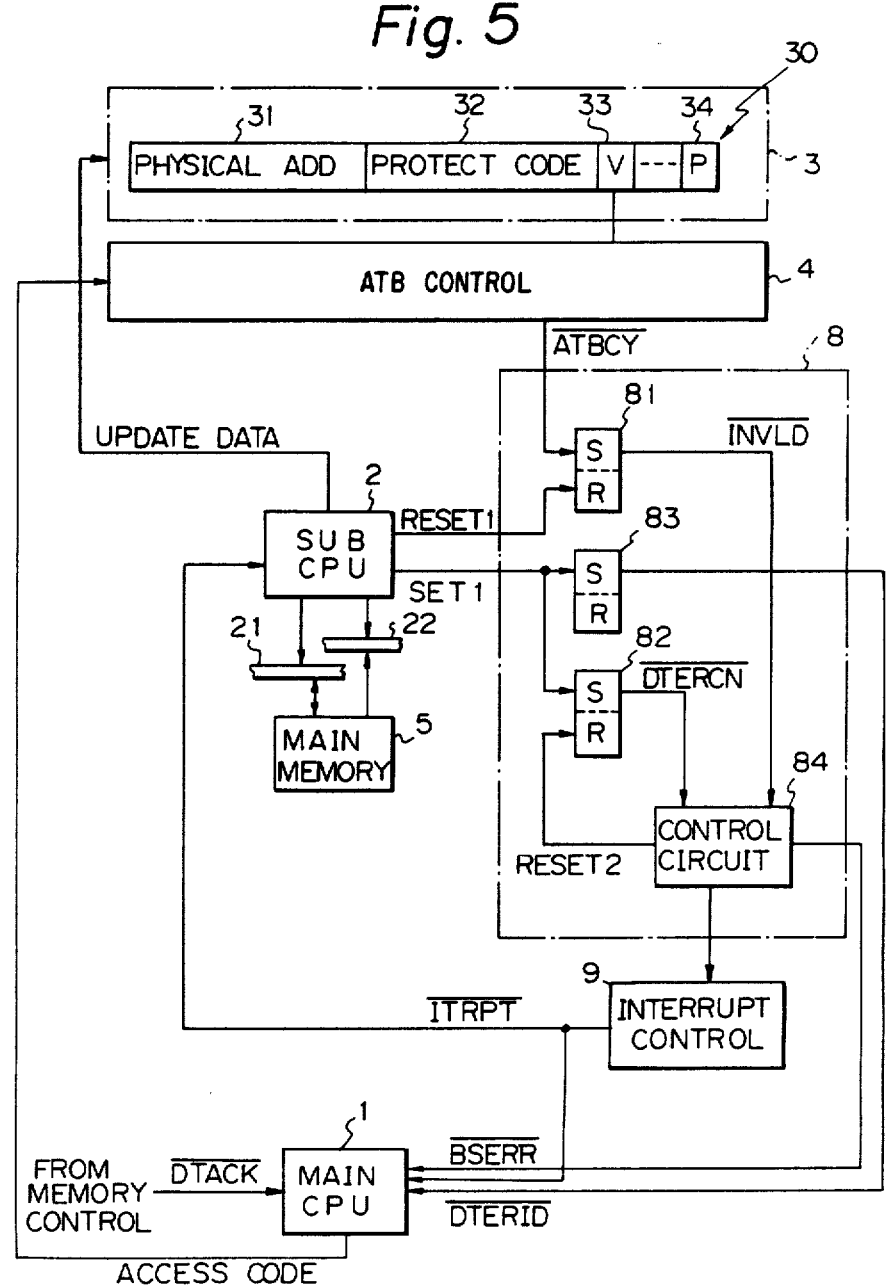
FIG. 5 is a circuit diagram of a part of the virtual memory computer system shown in FIG. 2.

The operation of invalid virtual accessing data will be described referring to FIGS. 5 and 6a to 6n.

When the main CPU 1 requests the virtual memory access with an access code by performing a corresponding function code FNCOD (FIG. 6b) a corresponding virtual accessing data 30 in the ATB 3 is retrieved to the ATB control unit 4, as set forth above. If an invalid bit 33 in the corresponding virtual accessing data 30 was set, an address translation buffer carry signal $\overline{ATBCY}$ is changed to low (FIG. 6e) and is supplied to a set input terminal of the invalid FF 81 in the CPU control unit 8, resulting in the invalid FF 81 being set. An invalid signal $\overline{INVLD}$ of low enable is output to the control circuit 84 (FIG. 6f). The control circuit 84 outputs an interruption request signal to the interrupt control unit 9. Upon receipt of the interruption request signal, the interrupt control unit 9 outputs an interrupt signal $\overline{ITRPT}$ of low enable to the sub-CPU 2 (FIG. 6g). Upon receipt of the $\overline{ITRPT}$ signal, the sub-CPU 2 immediately starts the known halt processing task, which consists of an acknowledge cycle (ACK CYCLE) operation, a static RAM write (SRAM WRITE) operation, a static RAM read (SRAM READ) operation, a main memory read (MAIN-MEMO READ) operation, a reset (RESET) operation, and a return exception (RETURN EXCEPTION) operation (FIG. 6j). The static RAM is a program memory for the sub-CPU 2. During the acknowledge cycle operation, the sub-CPU 2 detects the invalidity of the virtual accessing data in response to the interrupt signal $\overline{ITRPT}$. The interrupt signal $\overline{ITRPT}$ is a logical signal of bi-state of low enable, i.e., a single significant-level interruption signal. The sub-CPU 2 responds only to a change of low level of the $\overline{ITRPT}$ signal, i.e., a change of a bi-state level. This enables shortening of analysis of the invalidity. During the static RAM write and read operations, the sub-CPU 2 searches the static RAM (not shown) in the sub-CPU 2 and finds the correct address of corresponding virtual accessing data in the main memory 5. During the main memory read operation, the sub-CPU 2 directly reads the corresponding virtual accessing data from the main memory 5 and checks the validity of the read virtual accessing data prior to storing it in the ATB 3. When the read virtual accessing data is valid, the sub-CPU 2 stores the virtual accessing data in the ATB 3. After that, during the reset operation, the sub-CPU 2 restores the $\overline{INVLD}$, and $\overline{ITRPT}$ signals (FIGS. 6e to 6g). Prior to starting the return exception operation in the sub-CPU 2, the main CPU 1 may start to re-request the virtual memory access in response to the restoration of the $\overline{ITRPT}$ signal at 103-th clock cycle in FIG. 6a, resulting in the restore time of the main CPU being shortened.

Another operation of invalid virtual accessing data will be described, in addition to the above embodiment of FIGS. 5 and 6a to 6n, referring to FIGS. 5 and 7a to 7o.

When the main CPU 1 requests virtual memory access with an access code, corresponding virtual accessing data 30 in the ATB 3 is returned to the ATB control unit 4. If an invalid bit 33 in the corresponding virtual accessing data 30 was set, as mentioned above with reference to FIGS. 5 and 6a to 6n, the sub-CPU 2 performs the halt processing task of the ACK CYCLE operation, the SRAM WRITE operation, the SRAM READ operation, and the MAIN-MEMO READ operation.

During the MAIN-MEMO READ operation, the sub-CPU 2 reads the corresponding virtual accessing data from the main memory 5 and checks the validity of the read virtual accessing data prior to storing it in the ATB 3. When an invalidity of the read virtual accessing data is detected at the 80-th clock cycle (FIG. 7a), the sub-CPU 2 outputs a set signal SETI to set input terminals of the data error control FF 82 and the data error indication FF 83 in the MPU control unit 8, resulting in the FF's 82 and 83 being set and thus output of a data error control signal $\overline{DTERCN}$ of low enable from the FF 82 to the control circuit 84 (FIG. 7o) and a data error indication signal $\overline{DTERID}$ of low enable from the FF 83 to the main CPU 1. The read invalid virtual accessing data is not stored in the ATB 3. The sub-CPU 2 performs the RESET operation, resulting in the $\overline{INVLD}$ in the FF 81 being cleared. Upon receipt of the $\overline{INVLD}$ signal of high level, the control circuit 84 outputs the bus error signal $\overline{BSERR}$ of low enable to the main CPU 1 (FIG. 7n) when the $\overline{DTERCN}$ signal is low enable.

The main CPU 1 will restart and read the $\overline{BSERR}$ signal of low level and the $\overline{DTACK}$ signal of high level, whereby the main CPU 1 recognizes the error of the request. The main CPU 1 further reads the $\overline{DTERID}$ signal of low level so as to readily discriminate the reason of the error without analyzing the multilevel interruption, which analysis may require a considerably long time. The main CPU 1 terminates the task in question without outputting a re-request. Accordingly, the $\overline{CAS}$ signal is not changed (FIG. 7l).

During the RETURN EXCEPTION operation, the control circuit 84 outputs a reset signal RESET2 to a reset input terminal of the data error control FF 82, resulting in the $\overline{DTERCN}$ signal being restored to high level (FIG. 7o). Simultaneously, the control circuit 84 restores the $\overline{BSERR}$ signal (FIG. 7n).

The data error indication FF 83 may be reset by the RESET22 signal.

As mentioned above, the provision of the sub-CPU 2 increases the halt operation time, and the provision of the invalid FF 81, the data error control FF 82, and the data error indication FF 83 contributes to a rapid error detection and simplifies the programs in the main CPU 1.

The above invalid FF, the data error control FF, and the data error indication FF may be easily replaced by registers, memory cells, or the like in the CPU control unit 8.

Many widely different embodiments of the present invention may be constructed without departing from the spirit and scope of the present invention It should be understood that the present invention is not limited to the specific embodiments described in this specification, except as defined in the appended claims.

We claim:

1. A computer system comprising:
    a first computer means for processing tasks;
    a second computer means independently operable from said first computer means for processing virtual address control;
    a main memory means, operatively connected to said first and second computer means, for storing an address conversion table converting a virtual memory address into an actual memory address;

a buffer memory means, operatively connected to said first and second computer means, for storing pairs of virtual memory addresses and corresponding actual memory addresses; and control means for controlling operations of said first and second computer means, said main memory means, and said buffer memory means, including first and second latch means, wherein, when said first computer means outputs a virtual memory address to said buffer memory means to obtain a corresponding actual memory address, said buffer memory means outputting said actual memory address, corresponding to said output virtual memory address, within said address pairs transferred from said main memory means, when said corresponding actual memory address output from said buffer memory means is determined to be invalid by said control means, said first latch means being set in order to halt said first computer means from outputting other virtual memory addresses, said control means outputting an interruption signal for activating said second computer means, and said second computer means accessing said address conversion table in said main memory means to find a pair of virtual and actual addresses corresponding to said output virtual memory address in response to said interruption signal, said second computer means reading said found pair of virtual and actual addresses from said address conversion table and storing said found pair of said virtual and actual addresses in said buffer memory means in order to output a corresponding actual memory address from said buffer memory means to said first computer means, said second computer means resetting said first latch means to enable said first computer means to output other virtual memory addresses, when said second computer means detects that said output virtual memory address is erroneous after searching said address conversion table in said main memory means and not finding said output virtual memory address, said second computer means setting said second latch means to terminate access for said output virtual memory address and resetting said first latch means to remove said halt for said first computer means.

2. A computer system according to claim 1, wherein said first latch means is reset by a signal from said second computer means after completion of a reset operation of said second computer means.

3. A computer system according to claim 2, wherein said second latch means is reset by a signal generated in said control means after completion of a reset operation of said second computer means.

4. A computer system according to claim 1, wherein said controlling means further includes a memory control unit controlling said main memory means in response to a request from said first and second computer means.

5. A computer system according to claim 1, wherein said control means further includes a third latch means which is simultaneously set with said second latch means, connected to said first computer means.

6. A computer system according to claim 5, wherein said third latch means is simultaneously reset with said second latch means by a signal generated in said control means after completion of a reset operation of said second computer means.

7. A computer system according to claim 6, wherein said third latch means is a one-bit latch means.

8. A computer system according to claim 7, wherein said third latch means is a flip-flop.

9. A computer system according to claim 7, wherein said third latch means is a memory cell.

10. A computer system comprising:

a first computer means;

a second computer means independently operable from said first computer means;

a main memory means, operatively connected to said first and second computer means, storing an address conversion table converting a virtual memory address to an actual memory address;

a buffer memory means, operatively connected to said first and second computer means, storing pairs of virtual memory addresses and corresponding actual memory addresses; and control means for controlling operations of said first and second computer means, said main memory means, and said buffer memory means, including first and second latch means, said first latch means being reset by a signal from said second computer means after completion of a reset operation of a virtual accessing data transfer of said second computer means, and said second latch means being reset by a signal generated in said control means after completion of the reset operation of the virtual accessing data transfer of said second computer means, wherein said control means includes an address transfer buffer control unit controlling said buffer means and having a parity check circuit checking parity of virtual accessing data from said buffer means and a compare circuit comparing a protection code in said virtual accessing data and an access code from said first computer means, a computer control unit controlling the operation of said first and second computer means and having first and second latch means and a control circuit outputting error detection control signals to said first and second computer means, and an interruption control unit outputting an interruption signal to said second computer means in response to an error detection in said address transfer buffer control unit to trigger said second computer means;

said first computer means issuing a virtual memory address to said buffer memory means, said buffer memory means outputting an actual memory address corresponding to said issued virtual memory address within said address pairs to said main memory means when said corresponding actual memory address output from said buffer memory means is determined to be invalid by said control means, said first latch means being set to halt access to said main memory means by said first computer means, said control means outputting an interruption signal for said second computer means, and said second computer means finding a pair of addresses corresponding to said issued virtual memory address from said address-conversion table in response to said interruption signal, storing said found address pair of said buffer memory means and resetting said first latch means, to output a corresponding actual memory address from said buffer memory means to said main memory means, when said second computer means detects said issued virtual memory address being erroneous by searching said address conversion table, said second computer means setting said second latch means to terminate access and resetting said first latch means to remove said halt to access.

11. A computer system according to claim 10, wherein a control circuit outputs said bi-state interruption signal responsive to a an error detection in said address buffer control unit to trigger said second computer means and a multilevel interruption signal when said issued virtual memory address is detected to be erroneous after searching said address conversion table.

12. A computer system according to claim 11, wherein said control unit resets said second latch means.

13. A computer system according to claim 12, wherein said first latch means is a one-bit latch circuit.

14. A computer system according to claim 13, wherein said first latch means is a flip-flop.

15. A computer system according to claim 13, wherein said first latch means is a memory cell.

16. A computer system according to claim 12, wherein said second latch means is a one-bit latch means.

17. A computer system according to claim 16, wherein said second latch means is a flip-flop.

18. A computer system according to claim 16, wherein said second latch means is a memory cell.

19. A computer system comprising:
a first computer means for processing tasks;
a second computer means independently operable from said first computer means for processing virtual address control;
a main memory means, connected to said first and second computer means, for storing an address conversion table converting a virtual memory address into an actual memory address;
a buffer memory means, connected to said first and second computer means, for storing pairs of virtual memory addresses and corresponding actual memory addresses, said buffer means including a searching means for searching for a pair of virtual and actual memory addresses corresponding to said virtual address output from said first computer means, and an address translation means for translating virtual memory addresses into corresponding actual memory addresses; and
control means for controlling operations of said first and second computer means, said main memory means, and said buffer memory means, said control means including an invalid latch means, a data error control latch means and a data error indication latch means, wherein,
when said first computer means outputs a virtual memory address to said buffer means to obtain a corresponding actual memory address, said buffer memory means outputting said actual memory address, corresponding to said output virtual memory address, within said address pairs transferred from said main memory means,
when said corresponding actual memory address output from said buffer memory means is determined to be invalid by said control means, said invalid latch means being set in order to halt said first computer means from outputting other virtual memory addresses, said control means outputting an interruption signal for activating said second computer means, and said second computer means accessing said address conversion table and said main memory means to find a pair of virtual and actual addresses corresponding to said output virtual memory address in response to said interruption signal, said second computer means reading said found pair of virtual and actual addresses from said address conversion table and storing said found pair of said virtual and actual addresses in said buffer memory means in order to output a corresponding actual memory address from said buffer memory means to said first computer means, said second computer means resetting said invalid latch means to enable said first computer means to output other virtual memory addresses,
when said second computer means detects that said output virtual memory address is erroneous after searching said address conversion table in said main memory means and not finding said output virtual memory address, said second computer means setting said data error control latch means to terminate access for said output virtual memory address, resetting said invalid latch means to remove said halt for said first computer means and setting said data indication latch means to indicate that said output virtual memory address is erroneous.

* * * * *